Feb. 8, 1955  P. C. J. GILSON  2,701,653
INSTALLATION FOR THE STORAGE AND DISTRIBUTION
OF MOLDING EARTH, MANURES, AND THE LIKE
Filed Oct. 7, 1953  4 Sheets-Sheet 1
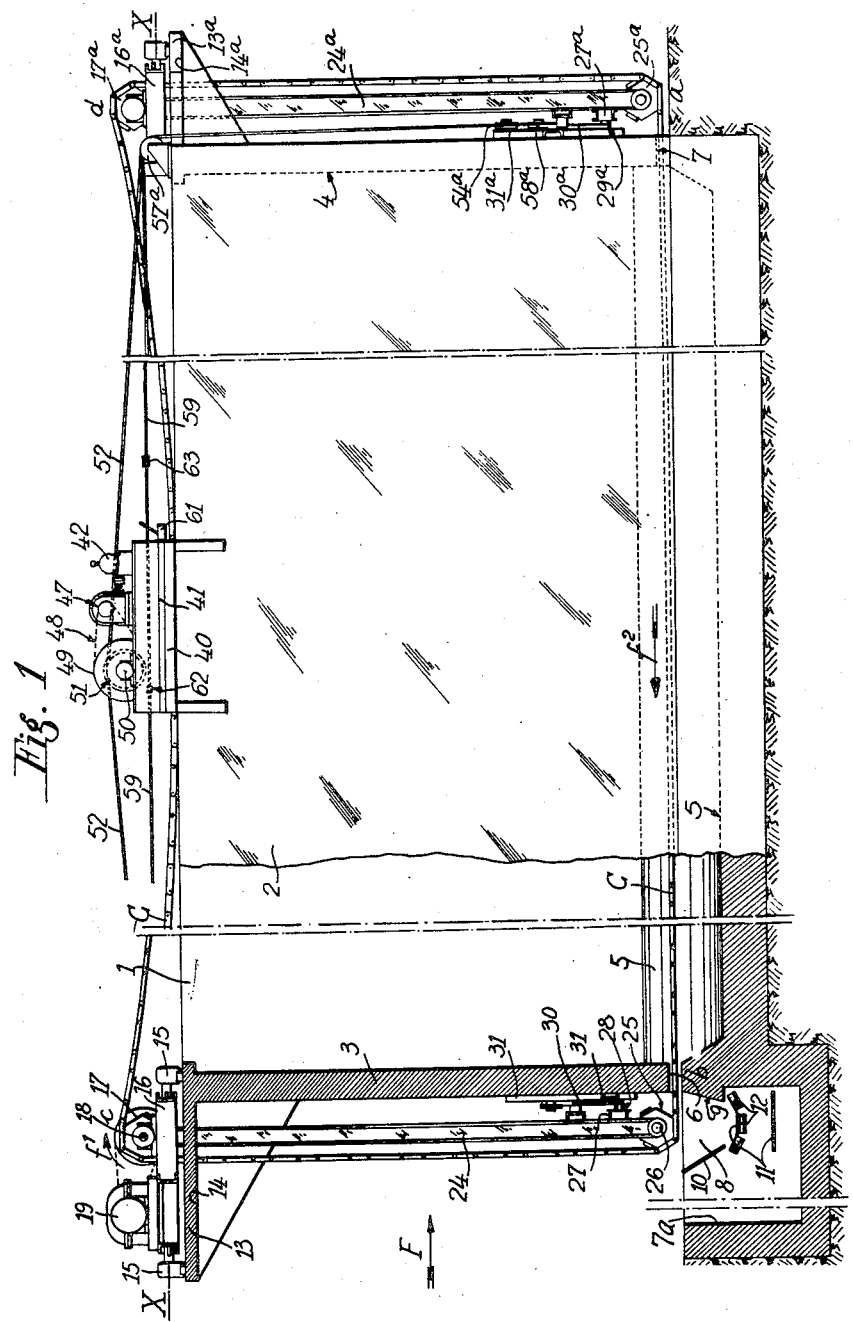

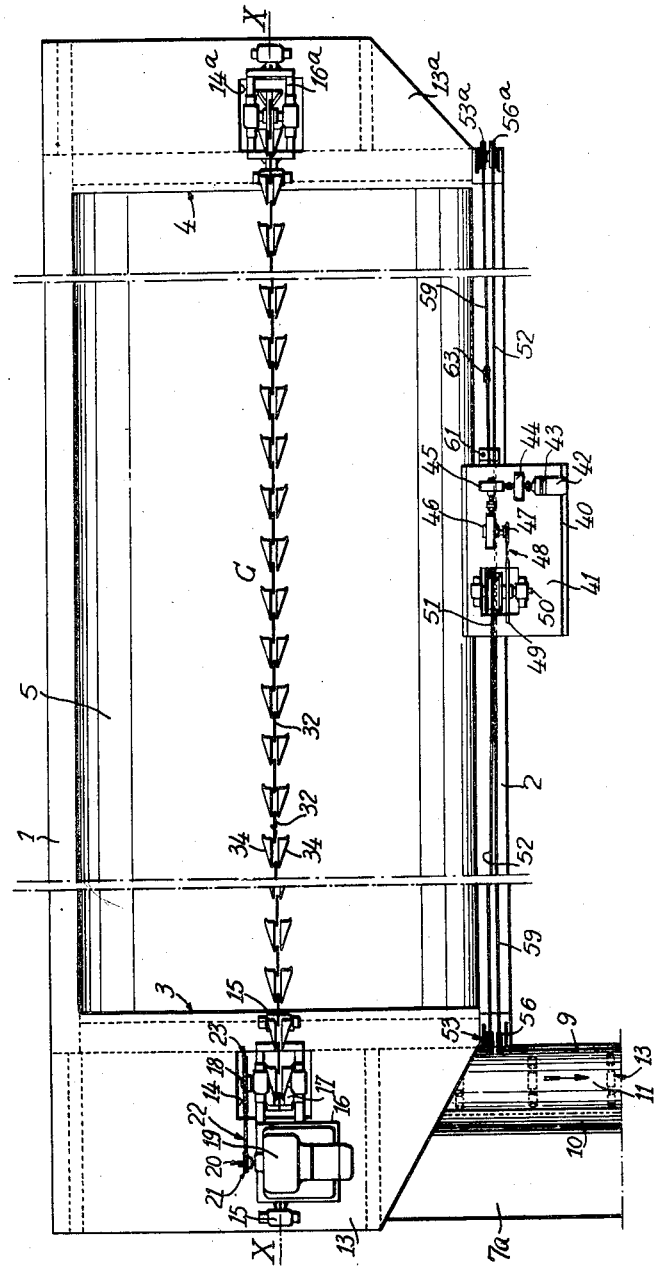

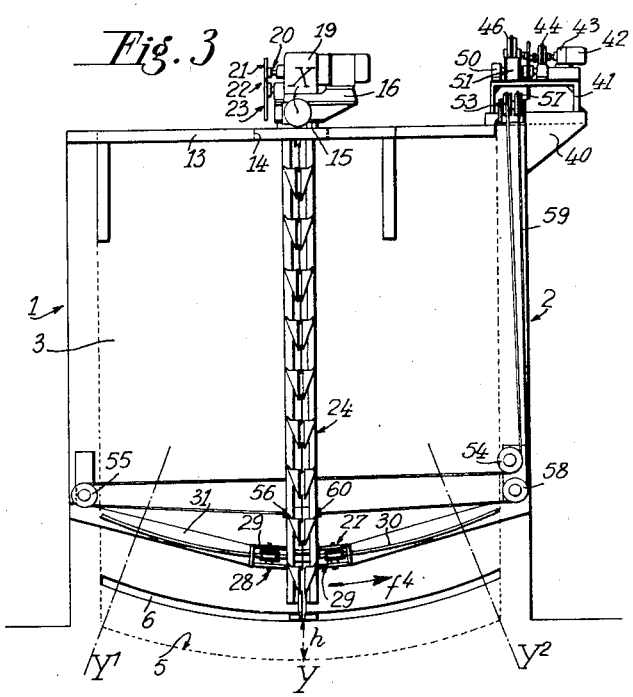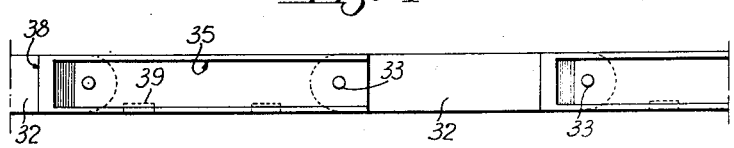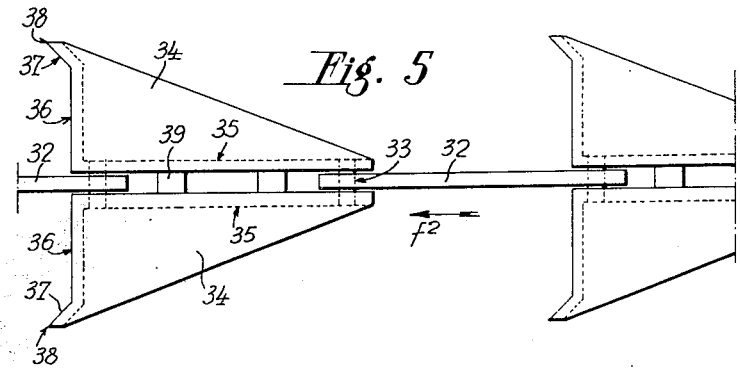

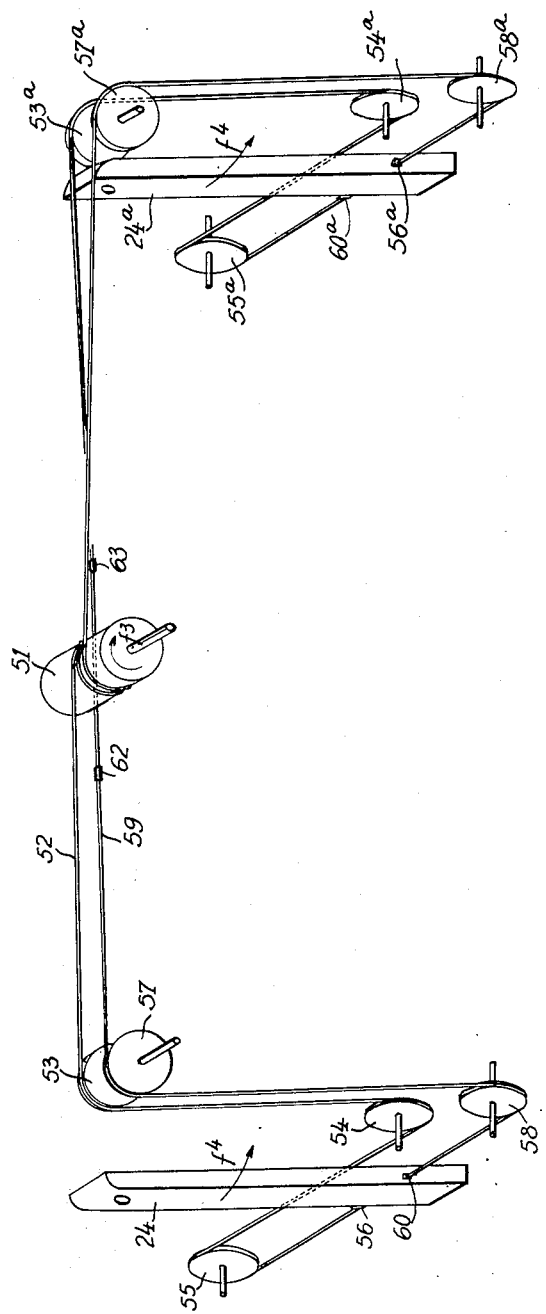

United States Patent Office 2,701,653
Patented Feb. 8, 1955

2,701,653

INSTALLATION FOR THE STORAGE AND DISTRIBUTION OF MOLDING EARTH, MANURES, AND THE LIKE

Pierre Charles Jean Gilson, Campagne-lez-Wardrecques par Wardrecques, France

Application October 7, 1953, Serial No. 384,640

Claims priority, application France September 8, 1953

8 Claims. (Cl. 214—17)

The present invention relates to installations for the storage and distribution of pulverulent or granular material capable of agglomerating such as molding earth and sand, manures and the like, of the type which comprises in combination a pit or other recipient for the storage end, if need be, the conversion or conditioning of the material, for example the maturing thereof, and an extracting device adapted to this pit for the continuous extraction of the material stored. It relates more particularly to pits employed in the storing and maturing of earths intended for pottery industries, brick-yards and similar industries. These earths must undergo before their use an ageing to ensure that they are evenly moistened throughout.

In known pits suitable for such storing and maturing, the stored material is taken off the top layer with the aid of a machine such as an excavator or a grab-bucket. As will be understood, it is difficult to bring to the pit further material while this excavating machine is in operation. The feeding and extracting devices are generally disposed in different parts of the pit so that in practice one half of the pit is in course of being filled while the other half is being emptied. Thus, it has been found that one half the pit is usually half empty while the other is half filled, so that the average storage capacity is only 50% of the total volume of the pit.

The invention has for object an installation for storing and distributing of the aforementioned type having a pit and extracting device but improved in such manner that this pit may be fully utilized whereby for a given storage capacity the overall size thereof may be reduced by half compared to pits of known type.

This improved installation is characterized in that the pit is provided with an extracting device of which at least the active portion is situated interiorly of this pit adjacent the bottom thereof and is given, firstly a continuous longitudinal movement with respect to itself in a first direction for extracting the stored material, through an outlet opening extending over the entire width of one of the walls of this pit, and, secondly, a reciprocating movement of translation in a second direction perpendicular to the first direction, whereby said active portion of the extracting device sweeps the entire area in plan of the pit.

Inasmuch as it may be filled from above and emptied from below, this pit may be constantly 100% full. The extracting device does not merely hollow out a tunnel in the stored material, as would be the case if it were given only a longitudinal movement with respect to itself, but actually scoops out and carries away material as it passes through the pit. Hence, owing to the reciprocating transverse displacement of the extracting device, the tunnel is destroyed as soon as it is formed, and experience has shown that the extraction is accomplished in a continuous and perfect manner at a strictly constant rate depending on the linear speed of the extracting device.

According to one embodiment, the extracting device comprises a deformable endless loop one of the longitudinally extending portions of which constitutes the active or extracting portion, and traverses two facing walls of the pit through two facing openings one of which constitutes an inlet opening for said active portion and the other the outlet opening for the latter and the extraction of the stored material, whereas the longitudinal extending return length is situated above the pit. This endless loop passes around rotative members one of which is driven by a first drive device and is adapted to impart to this endless loop a continuous movement with respect to itself, these rotative members being carried by a support device which is mounted to pivot about a substantially horizontal axis situated near the top of the pit and is combined with a second drive device adapted to pivot this support device. The inlet and outlet openings of the pit are arcuate in shape and are centered on said pivot axis.

Other features and advantages of the invention will become apparent from the ensuing description.

In the accompanying drawings, given solely by way of example:

Fig. 1 is an elevational view partly in section of an installation improved in accordance with the invention.

Fig. 2 is a plan view thereof.

Fig. 3 is an end view in the direction of arrow $f$ of Fig. 1.

Fig. 4 is a side elevational view on a larger scale of a portion of the endless extracting device.

Fig. 5 is a corresponding view in plan, and

Fig. 6 is a perspective view of the cables and pulleys of a drive device adapted to pivot the extracting device and its support.

According to the illustrated embodiment, the invention comprises a pit having a rectangular shape in plan. This pit, which is open at its upper end, is composed of four vertical walls, two longitudinal walls 1 and 2, and two transverse walls 3 and 4. The upper face of the bottom of the pit has the shape of a section of a cylinder the axis XX of which is disposed parallel to the walls 1 and 2, slightly above the open upper end of the pit, and lies in the longitudinal vertical plane of symmetry of the latter (Figs. 1 and 2).

The dimensions of this pit are not important. They may vary within wide limits depending on the desired storage capacity. For example, its width may be of the order of four meters, its depth of the order of five meters, and its length of the order of several dozen meters, for example forty meters.

In the front and rear end walls 3 and 4, and at the lower part thereof at a distance $h$, for example of the order of a few decimeters above the bottom, are provided two openings 6 and 7 in the shape of arcuate slots centered on the axis XX and having a radial width of the order of about ten centimeters (Fig. 3).

Beyond the front wall 3 is disposed a transverse ditch $7^a$ in which is disposed along the outlet opening 6 a receiver trough 8. The latter comprises an inclined wall 9 forming part of the ditch and a wall 10 fixed relative to the latter. Below this receiver trough is disposed an endless conveyor 11 the upper face of which is preferably concave, as may be obtained with the illustrated arrangement of the conveyor rollers 12.

The storage pit is completed by an extracting mechanism which will now be described. On the ridge of the front wall 3 is disposed a small concrete platform 13 provided with a rectangular opening 14. Two bearings 15 fixed on this platform 13 support a pivotal stand 16. On this stand is rotatively mounted a driving sprocket 17 keyed to a transverse horizontal shaft 18. This shaft and the sprocket 17 are driven in rotation in the direction of arrow $f^1$ (Fig. 1) by a low-speed motor 19 fixed on the stand 16 and whose output shaft 20 is connected to the shaft 18 of the sprocket 17 by a transmission comprising sprocket 21, chain 22 and a chain wheel 23.

Under this pivotal support 16 is rigidly secured a beam 24 which freely passes through the opening 14 of the platform 13. This beam 24 carries at its lower end a second sprocket 25 which is freely rotative on its shaft 26. Just above the sprocket 25 on the beam 24 is fixed, by welding or otherwise, a cage-like support 27 (Figs. 1 and 3) on which are freely rotative about two shafts 28 parallel to the beam 24 and disposed on either side of the latter, two grooved rollers 29. These two rollers are adapted to roll along an arcuate rail 30 concentric with the opening 6 of the pit, i. e. centered on the axis XX. This rail 30 is fixed on a support 31 which has, for example, a U-shaped section (see Fig. 1), and which is bedded in the front wall 3 of the pit. On the ridge of the rear wall 4 is provided another platform $13^a$ provided with an openig $14^a$ and equipped with a unit similar to the above-described unit except that the pivotal stand 16 carries a sprocket $17^a$ which is freely rotated in the same way as the lower sprocket 25ᵃ carried by the beam 24ᵃ. This beam 24ᵃ carries, like the beam 24, a cage-like support 27ᵃ provided with two rollers 29ᵃ adapted to roll on the arcuate rail 30ᵃ carried by the support 31ᵃ.

Around the four sprockets comprising the drive sprocket 17, the freely rotative sprockets 25, 25ᵃ and 17ᵃ, passes an endless chain C which constitutes the extracting device. This chain forms, therefore, an endless loop whose lower portion $ab$ is the active portion; for, under the action of the driving sprocket 17 which rotates in the direction of arrow $f^1$, this portion is continuously displaced in the direction of arrow $f^2$ (Fig. 1) from $a$ toward $b$, the chain entering the pit through the inlet opening 7 and emerging therefrom through the outlet or extraction opening 6. The upper portion $cd$ extends with a certain amount of slack across the upper part of the pit. The chain C may therefore be likened to a band saw. Some of its links are represented on a larger scale in Figs. 4 and 5. Every other link is a plain flat link 32 provided with holes at each end for its pivotal connection to pins 33 fixed to the two adjoining links which have a special shape. The latter links are double-sided and each comprises two scoops 34 having a substantially triangular shape and including a cavity 35 open along the outer lateral edges of the scoops. The front face 36 (relative to the direction of movement as represented by arrow $f^2$ in Fig. 5) is flat but is terminated by a forwardly directed oblique portion 37 which forms a cutting leading edge or tooth 38. The two scoops 34 are rigidly connected by a certain number of spacer members 39 welded to the scoops.

The above-described unit comprising the chain C, the supporting beams 24 and 24ᵃ, the pivotal stands 16 and 16ᵃ, and the first drive device including the motor 19, is completed by a second drive device. The latter is adapted to pivot the unit with an oscillatory movement about the axis XX, the two beams 24 and 24ᵃ moving together in synchronism so that the longitudinal plane XY (Fig. 3) containing the chain C, oscillates about the axis XX between extreme positions XY¹ and XY², whereby in the course of each forward and backward oscillating movement the lower active portion $ab$ of the chain C sweeps over the entire pit in generating a surface which is parallel to the bottom 5 and is situated at a distance $h$ from the latter.

This second drive device comprises a support 41 carried by a third platform 40 of concrete or other material which is fixed to the upper part of the longitudinal wall 2. On this support is fixed a reversible electric motor 42 coupled to a speed changer 43. The output shaft of the latter drives reduction gears 44, 45 and 46. The last gear, 46, is operatively connected by a sprocket 47, chain 48 and chain wheel 49, to the shaft 50 of a drum 51. On this drum 51 is wound several times a cable 52 which is connected to the two beams 24 and 24ᵃ (see in particular Fig. 6). The length of this cable which extends from the drum 51 to the beam 24 passes firstly over a first pulley 53 carried by the wall 3, then over two other pulleys 54 and 55 (Fig. 3) carried by the support 31, and is finally fixed at 56 to the beam 24. The other length of the cable, which extends from the pulley 51 to the beam 24ᵃ, passes round two pulleys 57ᵃ and 58ᵃ and is fixed at 56ᵃ to the beam 24ᵃ. The two beams 24 and 24ᵃ are directly connected by a further cable 59 which is fixed to these beams at 60 and 60ᵃ and passes at the front end of the pit around two pulleys 57 and 58 and at the rear end around three pulleys 53ᵃ, 54ᵃ and 55ᵃ.

As will be understood, the rotation of the drum 51 in the direction of arrow $f^3$ (Fig. 6) causes the beams 24 and 24ᵃ to pivot in the direction of arrows $f^4$ (Figs. 3 and 6), whereas the rotation of the drum in the opposite direction pivots the beams in the direction opposite to that indicated by arrows $f^4$.

The rotation of the motor 42 and, in consequence, of the drum 51 in one direction or the other is controlled by an electric reversing switch 61 (Figs. 1 and 2) the actuation of which is ensured by two blocks 62 and 63 fixed in adjustable positions on the cable 56. Each time a block (62 or 63) encounters the switch 61, it puts the latter in such position as to cause the motor 42 to rotate in the opposite direction to that in which it rotated to cause this block to encounter the switch. By suitably selecting the distance between the two blocks 62 and 63, the amplitude of the oscillatory movements of the beams may be regulated. The speed of the oscillatory movements is controlled by the speed changer 43.

The installation operates in the following manner:

The sprocket 17, which is driven in rotation in the direction of arrow $f^1$ by motor 19, draws on the chain C and imparts to its lower portion $ab$ a longitudinal movement of translation in the direction of arrow $f^2$. As this lower portion is embedded in the earth or other material to be extracted, it scoops out certain amounts from the latter by means of its laterally extending teeth 38. These amounts accumulate in the cavity situated between the leading edge 36 of each double link and the plain link which precedes it.

At the extraction end of the pit, the chain C empties the material into the receiver trough 8 whence this material is conveyed by the endless belt 11. In addition to the scooping action, the chain C undergoes a transverse movement. In the course of the transverse movement in one direction, for example in the direction of arrow $f^4$ (Fig. 3), the chain scoops the material with the teeth 38 disposed on the right side thereof, whereas in the course of the return movement in the opposite direction to arrow $f^4$, it scoops with the teeth disposed on the left side.

The storing and extracting installation operates therefore as a feeder whose discharge is constant but adjustable. This discharge is manually adjustable by increasing or decreasing the transverse cutting action of the chain, i. e. by varying the speed of the oscillatory movement of the beams 24 and 24ᵃ. This speed, it will be recalled, is governed by the speed changer 43.

The invention presents, in addition to the above-mentioned advantage of permitting the pit to be worked at 100% efficiency, numerous other advantages, and in particular the following:

a. Since the extracting device extracts the material from the bottom of the pit, the oldest material is always used first. Hence the maturing or ageing, for example the thorough and uniform moistening of the material in the case of clay or other earth, benefits from the longest possible period for its conditioning.

b. The longitudinally extending walls 1 and 2 which form the two long sides of the pit are in one piece, they are not weakened by slots or grooves and their construction is therefore simple, robust and cheap.

c. As the material leaves the pit through one of the narrow sides thereof, the conveyor 11 may be very short and therefore economical.

d. Several similar installations may be arranged side by side for discharging onto a single conveyor different products forming part of a desired mixture.

e. The various mechanisms utilized are very simple, are very easily accessible and maintained.

Although the constructional details of one embodiment of the invention have been herein described and illustrated, it must be understood that changes and modifications may be made therein without departing from the spirit of the invention or the scope of the appended claims.

Having now described my invention what I claim as new and desire to secure by Letters Patent is:

1. Installation for storing molding earth, manure and other pulverulent products and the like, this installation comprising in combination: a pit open at its upper end, having a rectangular horizontal section and comprising two vertical longitudinal walls, two vertical transverse walls and a bottom, one of said transverse walls comprising above and adjacent this bottom an inlet opening and the other of said transverse walls comprising above and adjacent this bottom an outlet opening, these openings being narrow and having an arcuate shape and the center of the arcuate shape being situated on a longitudinal axis located adjacent and above the upper end of the pit; a support device pivotally mounted about said axis and carrying rotative members; an extracting device in the form of an endless loop passed around said rotative members, the latter being disposed in such manner adjacent said transverse walls of the pit and exteriorly of the latter that this endless loop enters the pit through said inlet opening and emerges therefrom through said outlet opening, the portion of this endless loop disposed in the pit between these two openings forming an extracting active portion; a first drive device for driving in continuous rotation one of said rotative members, the other members being freely rotative, said driven rotative member being adapted to drive said endless loop and thereby continuously renew the active portion thereof by imparting thereto a longitudinal movement constantly in the same direction from said inlet opening toward said outlet opening;

and a second drive device for imparting a reciprocative oscillatory movement to said support device about said axis and thereby transversely displace said active portion of the endless loop in the pit.

2. Installation as claimed in claim 1, wherein said extracting device comprises an endless chain composed of links some of which are flat the others being double and including two scoops rigidly interconnected and disposed on either side of the plane of symmetry of the endless chain, said flat and double links being disposed in alternate fashion in said chain.

3. Installation as claimed in claim 2, wherein each of said scoops has a triangular shape, each scoop having a leading face with respect to the direction of movement of said chain which is flat and substantially perpendicular to said plane of symmetry along the major part of its length, this face being terminated by a forwardly protruding sharp edge, and these scoops being laterally and rearwardly hollowed out.

4. Installation as claimed in claim 2, wherein said rotative members comprise four sprockets, one of which is driven in continuous rotation by said first drive device.

5. Installation as claimed in claim 1, wherein said support device for the rotative members comprises the combination of two supports pivotally mounted on the pit about the aforementioned axis and two beams radially disposed about this axis adjacent the outer faces of said two transverse walls of the pit, these beams being rigidly fixed to said supports and being driven in synchronism by said second drive device.

6. Installation as claimed in claim 5, wherein said second drive device is so adapted as to permit a variation of the speed of the pivotal movements of the support device and of the amplitude of these movements.

7. Installation as claimed in claim 6, wherein said second drive device comprises in combination: a reversible electric motor, an electric reversing switch for controlling the direction of rotation of said motor, a speed changer driven by this motor, a speed reducing mechanism driven by said speed changer, a drum driven by this speed reducing mechanism, a first cable which is wound several times on said drum and is fixed at its ends to said beams, pulleys mounted on the pit for guiding said cable, a second cable directly connecting the two beams, further pulleys mounted on the pit for guiding said second cable, and two blocks adjustable in position on said second cable and adapted to actuate said electric reversing switch.

8. Installation as claimed in claim 1, wherein at the end of the pit and transversely thereof is disposed a conveyor adapted to receive and convey the material extracted from said pit.

References Cited in the file of this patent

UNITED STATES PATENTS

| | | |
|---|---|---|
| 812,230 | Raymond | Feb. 13, 1906 |
| 1,570,085 | Saxe | Jan. 19, 1926 |
| 2,632,555 | Schoonenwolf | Mar. 24, 1953 |
| 2,635,770 | Tiedemann | Apr. 21, 1953 |